United States Patent
Palatnik de Sousa et al.

(10) Patent No.: US 12,524,574 B2
(45) Date of Patent: Jan. 13, 2026

(54) DEFENSE AGAINST XAI ADVERSARIAL ATTACKS BY DETECTION OF COMPUTATIONAL RESOURCE FOOTPRINTS

(71) Applicant: Dell Products L.P., Round Rock, TX (US)

(72) Inventors: Iam Palatnik de Sousa, Rio de Janeiro (BR); Adriana Bechara Prado, Niterói (BR)

(73) Assignee: Dell Products L.P., Round Rock, TX (US)

( * ) Notice: Subject to any disclaimer, the term of this patent is extended or adjusted under 35 U.S.C. 154(b) by 444 days.

(21) Appl. No.: 17/937,242

(22) Filed: Sep. 30, 2022

(65) Prior Publication Data
US 2024/0111902 A1   Apr. 4, 2024

(51) Int. Cl.
*G06F 21/64*   (2013.01)
*G06F 21/57*   (2013.01)

(52) U.S. Cl.
CPC ........... *G06F 21/64* (2013.01); *G06F 21/57* (2013.01)

(58) Field of Classification Search
CPC .................................. G06F 21/64; G06F 21/57
See application file for complete search history.

(56) References Cited

U.S. PATENT DOCUMENTS

| | | | |
|---|---|---|---|
| 10,783,401 B1 * | 9/2020 | Jiang | G06N 3/086 |
| 10,839,268 B1 * | 11/2020 | Ardulov | G06N 5/04 |
| 2021/0097176 A1 * | 4/2021 | Mathews | G06N 5/01 |
| 2021/0319784 A1 * | 10/2021 | Le Roux | H04L 63/1441 |
| 2022/0012591 A1 * | 1/2022 | Dalli | G06N 3/082 |
| 2022/0114399 A1 * | 4/2022 | Castiglione | G06V 10/751 |
| 2022/0156376 A1 * | 5/2022 | dos Santos Silva | G06F 21/554 |

OTHER PUBLICATIONS

Adaptive iterative attack towards explainable adversarial robustness (Year: 2020).*
Adversarial attacks and defenses in XAI (Year: 2023).*
Explaining Vulnerabilities to Adversarial Machine Learning through Visual Analytics (Year: 2020).*
Detect Adversarial Attacks Against Deep Neural Networks With GPU Monitoring (Year: 2021).*
Dombrowski, A. K., Alber, M., Anders, C., Ackermann, M., Müller, K. R., & Kessel, P. (Sep. 2019 ), "Explanations can be manipulated and geometry is to blame," Advances in Neural Information Processing Systems, 32.
Slack, D., Hilgard, S., Jia, E., Singh, S., & Lakkaraju, H. (Feb. 2020), "Fooling LIME and SHAP: Adversarial Attacks on Post hoc Explanation Methods," In Proceedings of the AAAI/ACM Conference on AI, Ethics, and Society (pp. 180-186).

* cited by examiner

*Primary Examiner* — Philip J Chea
*Assistant Examiner* — Jasmine Mochen Day
(74) *Attorney, Agent, or Firm* — Workman Nydegger (57) ABSTRACT

One example method includes initiating an audit of a machine learning model, providing input data to the machine learning model as part of the audit, while the audit is running, receiving information regarding operation of the machine learning model, wherein the information comprises a computational resource footprint, analyzing the computational resource footprint, and determining, based on the analyzing, that the computational resource footprint is characteristic of an adversarial attack on the machine learning model.

20 Claims, 5 Drawing Sheets

FIG. 1

```
[25]: code = '''
with tf.GradientTape(persistent=True) as tape:
    tape.watch(im)
    predi = model(im)
    classi = predi[:,5]
grads = tape.gradient(classi,im)
'''

[26]: cProfile.run(code,sort=1)

2895 function calls (2878 primitive calls) in 0.008 seconds

Ordered by: internal time ncalls  tottime  percall  cumtime  percall filename:lineno(function)
       53    0.004    0.000    0.004    0.000 {built-in method tensorflow.python._pywrap_tfe.TFE_Py_FastPathExecute}
      9/1    0.000    0.000    0.004    0.004 base_layer.py:901(__call__)
        1    0.000    0.000    0.003    0.003 {built-in method tensorflow.python._pywrap_tfe.TFE_Py_TapeGradient}
       46    0.000    0.000    0.000    0.000 backprop.py:86(make_attr)
      126    0.000    0.000    0.000    0.000 context.py:815(executing_eagerly)
       30    0.000    0.000    0.003    0.000 backprop.py:132(_gradient_function)
        1    0.000    0.000    0.008    0.008 <string>:2(<module>)
        9    0.000    0.000    0.000    0.000 input_spec.py:159(assert_input_compatibility)
```

FIG. 2

```
[27]: code = '''
for i in range(30)
    with tf.GradientTape(persistent=True) as tape:
        tape.watch(im)
        predi = model(im)
        classi = predi[:,5]
        grads = tape.gradient(classi,im)
        grads = tape.gradient(grads,im)
'''
[28]: cProfile.run(code,sort=1)
```

```
         88353 function calls (87843 primitive calls) in 0.188 seconds

Ordered by: internal time ncalls  tottime  percall  cumtime  percall filename:lineno(function)
     1590    0.110    0.000    0.110    0.000 {built-in method tensorflow.python._pywrap_tfe.TFE_Py_FastPathExecute}
     1380    0.004    0.000    0.005    0.000 backprop.py:86(make_attr)
   270/30    0.004    0.000    0.087    0.003 base_layer.py:901(__call__)
       60    0.004    0.000    0.090    0.001 {built-in method tensorflow.python._pywrap_tfe.TFE_Py_TapeGradient}
      900    0.004    0.000    0.083    0.000 backprop.py:132(_gradient_function)
     3780    0.004    0.000    0.004    0.000 context.py:815(executing_eagerly)
      270    0.002    0.000    0.005    0.000 input_spec.py:159(assert_input_compatibility)
     1650    0.002    0.000    0.002    0.000 {built-in method tensorflow.python._pywrap_utils.flatten)
```

DEFENSE AGAINST XAI ADVERSARIAL ATTACKS BY DETECTION OF COMPUTATIONAL RESOURCE FOOTPRINTS

FIELD OF THE INVENTION

Embodiments of the present invention generally relate to machine learning (ML) models. More particularly, at least some embodiments of the invention relate to systems, hardware, software, computer-readable media, and methods for detecting adversarial attacks against explainable artificial intelligence (XAI) techniques.

BACKGROUND

Artificial intelligence/machine learning (AI/ML) systems often behave as black boxes. That is, such systems typically do not allow users, for example, to fully understand how certain inputs to the system, or algorithm, result in the generation of a certain output, even when the systems perform well at given tasks. In some cases, this lack of transparency may be due in part to the proprietary nature of some systems. However, as companies have employed more and more such algorithms, regulatory concerns have arisen in regard to transparency and the right of the users to an explanation as to how the output of the system was achieved.

For example, various segments of society increasingly need, and expect, ML/AI systems to be transparent, trustworthy and fair, but the methods to enable these attributes are still being actively researched and developed. That is, there is a need and expectation for developers to be able to explain how a system, model, or algorithm, produces the results that it does. This concept is sometimes referred to as Explainable Artificial Intelligence (XAI), that is, AI whose operations and output can be explained to a user. At the same time however, adversarial methods to attack XAI have also been developed, which could manipulate explanations according to the interests of adversarial actors. That is, some adversarial actors may have an interest in manipulating explanations that are generated concerning the operation of a model, for example, so as to mislead a user as to the true operation of the model, and/or as to the nature of the results obtained with the model.

As the foregoing suggests, two key roles in this problem may be those of the auditor, and the adversary. An auditor may be, for example, any person, company, algorithm, or similar, that is trying to explain the operation and/or predictions of a given black-box ML/AI system. To these ends, the auditor may have access to any number of XAI techniques, but may not necessarily own or control the black-box system being audited. The other role in these examples may be that of the adversary, which may be any person, company, algorithm, or similar, that has a black-box system which is biased or unfair in any way, and is trying to use adaptive attacks to fool the auditor into accepting the black-box as fair in its operation and output.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to machine learning (ML) models. More particularly, at least some embodiments of the invention relate to systems, hardware, software, computer-readable media, and methods for detecting adversarial attacks against explainable artificial intelligence (XAI) techniques.

In general, XAI attacks tend to occur at the time that an ML model is being audited. The XAI attacks may be associated with additional computation costs which may be measured, for example, as computing resources consumption, that leave a corresponding 'footprint.' Some embodiments may operate to detect such footprints, and thereby determine, or at least infer, that an attack is taking place and/or has taken place. Knowledge of the occurrence of the attack may then be used to devise and implement measures to stop an ongoing attack and/or to prevent future attacks.

Attack detection as implemented by example embodiments may be easier to achieve, and more reliable, than attempting to detect an attack by analyzing the outputs of XAI methods, or attempting to correct those outputs after the fact. As such, some embodiments of the invention are directed to defense of an auditing system, for ML/AI models, from adversarial attacks directed at the XAI methods of an auditor of the model.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may be able to detect manipulation of XAI results generated as part of an audit of an ML model. As another example, some embodiments may serve to increase confidence in the operation and transparency of an ML model. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context

The following is a discussion of aspects of a context for some example embodiments of the invention. This discussion is not intended to limit the scope of the invention, or the applicability of the embodiments, in any way.

In general, to provide some context for some embodiments of the invention, a description of some XAI methods used by auditors, as well as a description of some typical attacks used by adversaries, may be useful. Note that example embodiments may be broadly application to a variety of different XAI methods.

A.1 XAI Methods

Explainable AI methods may be largely divided into two major classes, namely, gradient methods and perturbation methods. Although various other taxonomies exist, and these classes are not mutually exclusive, this basic separation is pervasive and representative of the most used XAI techniques.

A.1.1 Gradient Methods

Gradient methods are typically employed for neural network (NN) classifiers, which are a common type of black box in ML/AI applications. In general, gradient methods may involve calculating the vector of derivatives of the output of the ML model, as a function of the input to the ML model.

To illustrate with the example of an ML image classifier model for image classification, the gradient method may involve calculating the gradient of each output node (a neuron corresponding to a given class) back to input nodes (each pixel in an image), resulting in a heatmap that shows which areas of an image were most relevant for performing a classification of the image. In more detail, a model may assign weights to various features, and then attempt to optimize those weights in such a way as to minimize error in the output. This may be done by determining the derivative of the error with respect to the weight(s), that is, by determining the gradient.

In actual implementations, these methods may leverage automatic differentiation functions from deep learning (DL) frameworks in order to facilitate the computation of the gradients. Different gradient explanation methods may change, average or otherwise modify the contribution of the gradients of a given input to generate slightly different outputs, but they all share this same basis.

A.1.2 Perturbation Methods

Perturbation methods are more general, broadly speaking, than gradient methods. These algorithms typically do not rely on implementation-specific automatic differentiation or any other information about the internal structure of the model. For this reason, many techniques of this type are thus said to be "model-agnostic."

Perturbation methods may only require the auditor to be able to feed an input to a model and obtain the prediction probabilities as output. The input is then perturbed, or changed, and the total change on the output arising from the perturbation is computed. From this information, the gradient explanation, or simply 'explanation,' may be generated.

With reference again to the ML image classification example, some example perturbations may involve dividing the image into various regions and covering those regions with gaussian noise, or blur, or other such perturbations. Then, the effects on the output predictions may be aggregated into a heatmap that shows the relevance of each region. The most relevant region(s) may be used by the model to infer a classification for the image. Various perturbation techniques differ from each other in the types of perturbations they use, and how they aggregate the changes in the output onto a final heatmap.

Figure 1:
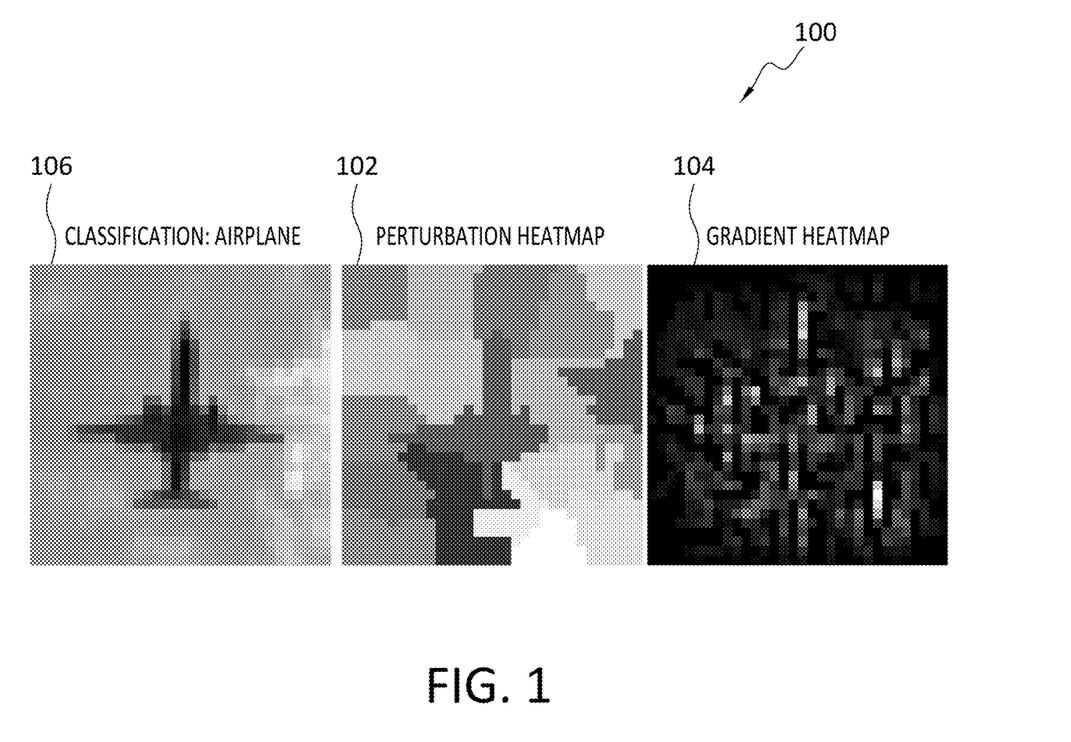
FIG. 1 discloses aspects of perturbation and gradient heatmaps in an image classification process.

As shown in the example scheme 100 of FIG. 1, respective perturbation and gradient heatmaps 102 and 104 are disclosed that may be used to enable a classification of an image. In the example of FIG. 1, the image classification 106 is an airplane, and it can be seen that the perturbation heatmap 102 provides a relatively better indication of the image classification than the indication provided by the gradient heatmap 104.

A.2 XAI Attacks

XAI attacks may be divided by the type of method and data they are related to. Gradient XAI attacks and Perturbation XAI attacks typically have different nuances.

A.2.1 Attacking Gradient Methods

These attacks are inspired by adversarial attacks on classifiers, where small changes are made on the values of inputs attempting to cause a model to misclassify input data, such as an image for example. Neural networks are notoriously vulnerable to this behavior, perhaps most famously on image classifiers that can greatly misclassify images with visually imperceptible changes to individual pixel values.

This same type of attack has been shown to work on gradient XAI methods. Particularly, adversaries can use gradient descent to train images that cause XAI methods to output whatever explanation heatmaps the adversary wishes. Moreover, adversaries are able to do this without greatly changing the prediction outputs by much, and by using visually imperceptible changes. This could, in principle at least, make it very hard for an auditor to notice that such attacks are taking place.

To continue with the previously references image classifier examples, one might assume a case where an auditor is analyzing a chest x-ray classifier sold by an adversary, which was trained to detect pneumonia in medical imaging data. Suppose it is further assumed that the adversary knows the classifier is biased or otherwise flawed in some way that would be detectable by XAI auditing. This could be perhaps the case where the model is predicting pneumonia based on spurious artifacts of the image or data set biases, rather than actually learning how to process discolorations on the lung. The adversary could then use an attack to fool XAI gradient methods into generating heatmaps that show the lungs as being the most important area, even when they were not identified as such by the un-tampered with output. This would fool the auditor into accepting the flawed model as ready for deployment.

Two aspects of gradient XAI attacks, that are true for all known such attacks and to which some embodiments may be directed are: (1) the adversarial images cannot be trained in a single pass through the model—rather, those adversarial images need several iterations before converging into an image that fools the XAI method; and (2) the gradient XAI attacks rely on second order gradients of the output as a function of the input. This happens because the loss of the gradient descent of the attack has the gradient explanation as one of its terms. As such, the attacker has to necessarily compute the gradient of the gradient at some point of the attack.

A.2.2 Attacking Perturbation Methods

Perturbation methods may be attacked by exploiting the nature of the perturbation process. Typically, when applying perturbations to an input, the resulting perturbed instance may statistically behave very differently from the original data distribution. This is often referred to as "Out-of-distribution" behavior (OOD). This means that in the process of perturbing the data to generate explanations, perturbation XAI methods generate a distribution of OOD data to present to the model.

An adversary that has a biased, flawed, or otherwise unfair, model could exploit OOD data by creating a set of classifiers that first determines whether a given input is OOD or not. If the input is OOD, that is, it came from the XAI method, the adversary passes it to a separately trained fair classifier that was trained to be fair only on OOD data. If the input comes from the original dataset distribution, the adversary passes it to the original, biased classifier. These two classifiers can be combined into a black box, and have been described in literature as a "scaffolding classifier." From the perspective of the auditor, it would not be possible to know that the scaffolding classifier attack is taking place simply by looking at the output of a perturbative XAI method.

B. Overview

Although Machine Learning (ML) is more and more pervasive throughout the years, much work remains to be done to audit reliability and fairness in ML models, in particular when such models are used to make decisions that greatly affect people's lives.

Explainable AI (XAI) techniques have been developed towards this goal but recent works in this area have unveiled their limitations and vulnerabilities. As an example, researchers have already demonstrated how fragile such techniques are in, for example, adversarial settings, where explanations can be intentionally controlled and manipulated, thus hiding potential biases, or other problems, in the ML model in question.

Indeed, recent works have showed how extremely biased classifiers can easily be manipulated into generating innocuous explanations in the eyes of the decision-makers. The lack of specific defenses against interpretation-based attacks creates scenarios where unfair and biased models can reach production and deployment stage, which can potentially cause significant damage to users and to the companies using such biased models. The models may have been initially biased unintentionally during training, or intentionally constructed from the ground up to be biased.

Thus, some embodiments consider that the known XAI attacks happen at auditing time, and incur in additional computation costs that leave a footprint. Because embodiments may operate to detect this footprint, an auditor could infer whether an attack is taking place, and take the appropriate measures. This detection is easier to achieve and more reliable than attempting to detect the attack by analyzing the outputs of XAI methods or attempting to correct them after the fact. As such, some example embodiments are directed to defending an auditing system for ML/AI models from adversarial attacks to the XAI methods of the auditor.

In at least some embodiments, an 'explanation' may be generated and rendered in a form, which may or may not be visual, such as a graph and/or text for example, that is perceptible and comprehensible by a human. Further, explanations may take various forms and types, and the scope of the invention is not limited to any particular form or type.

C. Further Aspects of Some Example Embodiments

Machine Learning (ML) and Artificial Intelligence (AI) models have seen increasing use in the past decade, but despite high performance and applicability, most models behave like black boxes whose decision making is not clear to users. This is particularly problematic in critical decision-making scenarios, where the lack of interpretability hinders trust in the models.

The area of Explainable AI (XAI) proposes a series of solutions for this issue, but several authors have noted that XAI methods are vulnerable to adversarial attacks. Some embodiments of the invention embrace a straight forward, reliable method for detection of attacks based on the computational resource footprint left by adversarial methods. Embodiments of such methods may aid auditors of classifiers in detecting if an adversary is tampering with various XAI methods. Some embodiments are based on the fact that XAI adversarial attacks require multiple iterations before converging, whereas a normal XAI auditing typically requires only a single pass through the model.

Because of the nature of attacks on XAI methods, discussed above, the adversary has to necessarily incur in increased computational costs when performing the attacks. As discussed, for instance in the case of gradients, whereas a normal gradient XAI heatmap is generated with a single pass of an image through a model and a single computation of the gradient vector, an attack necessarily requires, at minimum, two calls to the gradient function.

Moreover, results in the related literature show that realistic attacks require dozens or hundreds of calls to the gradient function, which means that instead of generating an explanation in milliseconds, which is usual for gradient XAI methods even for large models, an explanation generated during an attack would take significantly more time, maybe up the order of magnitude of seconds.

Because the adversary has no way of knowing which data the auditor will use during auditing, the adversarial attack must take place within the black box at auditing time. The auditor would then be able to detect that the explanation generation is taking a much longer time than usual for a gradient technique. In fact, this intuition can be expanded into a more detailed method where the auditor uses a profiler to not only evaluate the amount of time being taken in generating the explanation, but also which functions are being called and how many times this is taking place.

Figure 2:
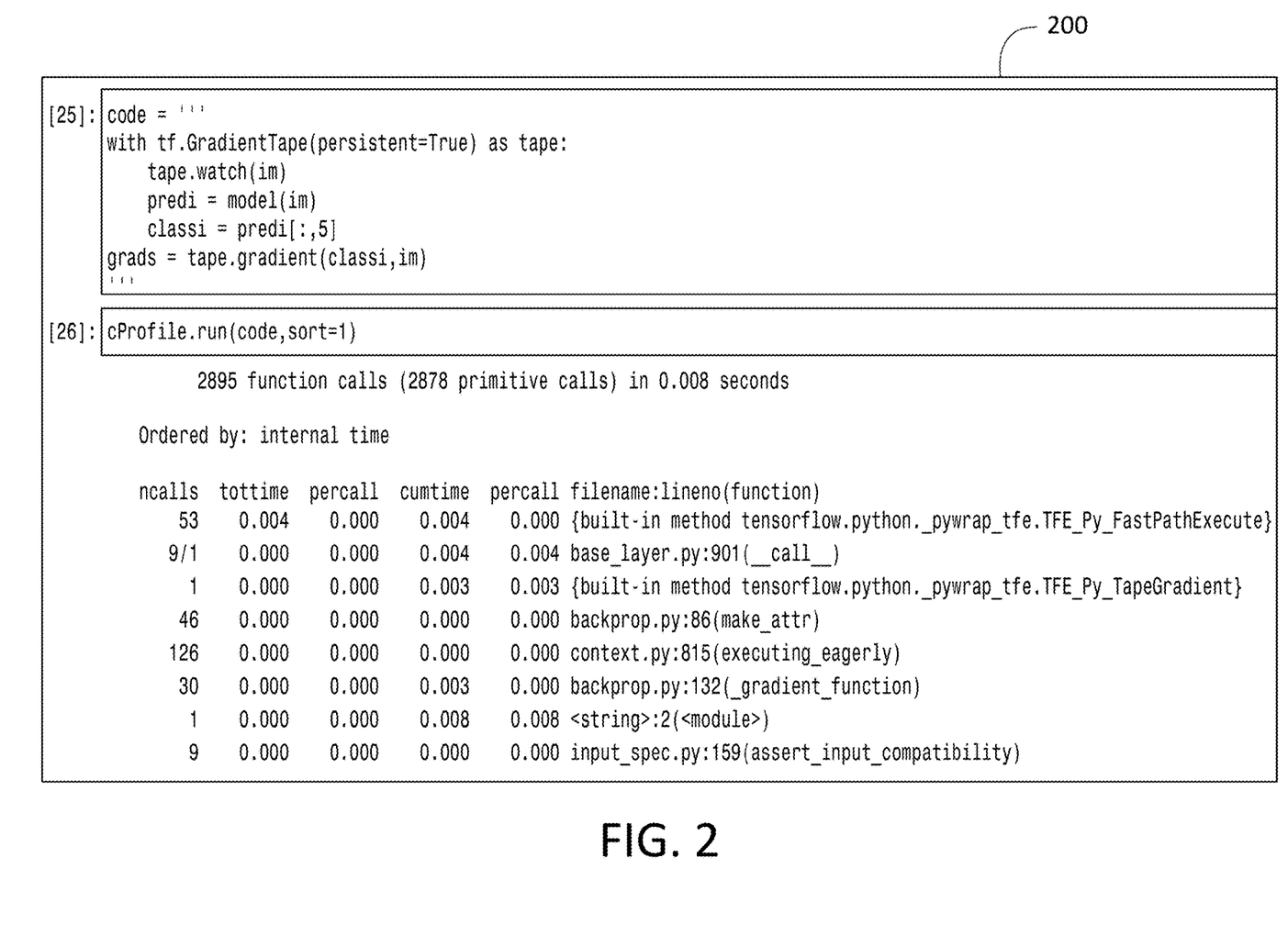
FIG. 2 discloses aspects of an XAI process where no attack is present.
Figure 3:
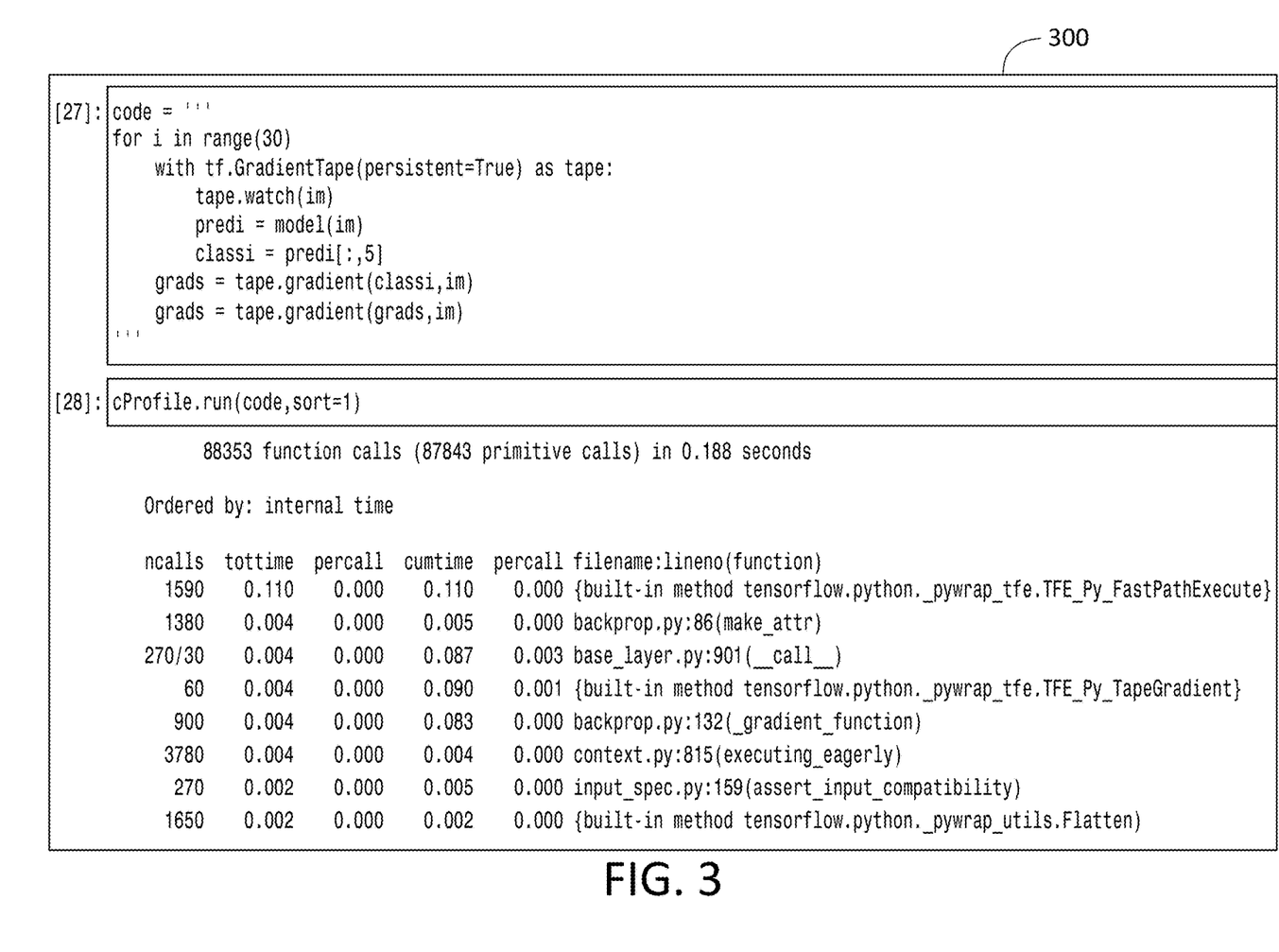
FIG. 3 discloses aspects of an XAI process where an attack has been made.

FIGS. 2 and 3 show an example of how this might look in a setting where a 'vanilla' gradients explanation is being generated, without (FIG. 2) and with (FIG. 3) an attack present, respectively. In particular, FIG. 2 discloses an execution 200 that comprises generating an XAI gradient explanation and profiling the computational footprint. Note that in FIG. 2, where no attack is being made, the explanation is generated in 0.008 seconds, using a total 2895 function calls, including 1 call to the TapeGradient function in the Tensorflow framework.

In the execution 300 in FIG. 3, a simplified simulation of an attack loop, such as may be employed by an adversary attempting to modify an XAI explanation output, can be seen, where an adversary is computing second order gradients to use for optimization purposes. Although the example of FIG. 3 uses 30 iterations, actual attacks might run for hundreds of iterations, or more.

Even in this simple example however, it is possible to see that the computation time increased from 0.008s to 0.188s (a 23.5× increase), and that the number of calls to the GradientTape went from 1 to 60 (twice in each of the 30 iterations). An auditor in possession of this information would immediately be able to tell that tampering is taking place, without needing any specific information on the internals of the black box. A similar case can be made for the scaffolding classifier attack, where an abnormal number of calls to prediction methods would be apparent, and computation times would also be higher than usual for that task.

C.1 Example Auditing Scenarios

In a general case, there are a few different scenarios which may be addressed by some embodiments. This scenario may be considered in terms of the level of information the auditor previously has on the adversary model. Three different scenarios are defined below.

C.1.1 Known Model Architecture, Profiling Access is Available

A realistic auditing scenario might involve a circumstance where the auditor knows the classifier architecture used by an adversary, but may not have access to the internals, such as weights and biases for example, of the model. The auditor may be assumed to also have access to detailed profiling information at auditing time, such as functions being called by the classifier. If an auditor has previous access to the type of model architecture used by the adversary, the auditor may run various profiling tests beforehand to know how much computation time, function calls and any other relevant computation footprints are typically expected. Any deviation from these baseline parameters at auditing time may be immediately detected by the auditor.

C.1.2 Unknown Model Architecture, Profiling Access is Available

Citing privacy or trade-secret reasons, for example, the adversary might withhold any access to architecture information from the auditor. In this case, the auditor may still have a series of benchmarks on known computation times and typical function calls of common architectures for various classifiers, data types and function calls. If the auditor detects major deviations from these baseline parameters, the auditor may proceed to ask the adversary for more information or access to the architectures internals, and if the adversary denies access, the author may mark the model as unacceptable due to a lack of transparency.

For example, the auditor might notice a gradient explanation that is taking 3 seconds of computational time and making hundreds of calls to automatic differentiation methods, unlike any previous benchmarks ever seen. This would be enough reason to consider the adversary is tampering with the explanation method within the black box.

C.1.3 Unknown Model Architecture, No Profiling Access

Next, consider the most difficult case, where the black box is restricted in such a way that the auditor cannot compute any information besides computation times for a given explanation that is generated. Although this scenario may or may not be realistic, even in this more extreme scenario, the auditor could still rely on this computational time information to evaluate whether a given model is deviating too far from known benchmarks and, based on this, the auditor may escalate the auditing by requiring more information from the adversary. Again, if the adversary declines to provide the requested information, the auditor may mark the model as unacceptable due to a lack of transparency.

D. Example Methods

Figure 4:
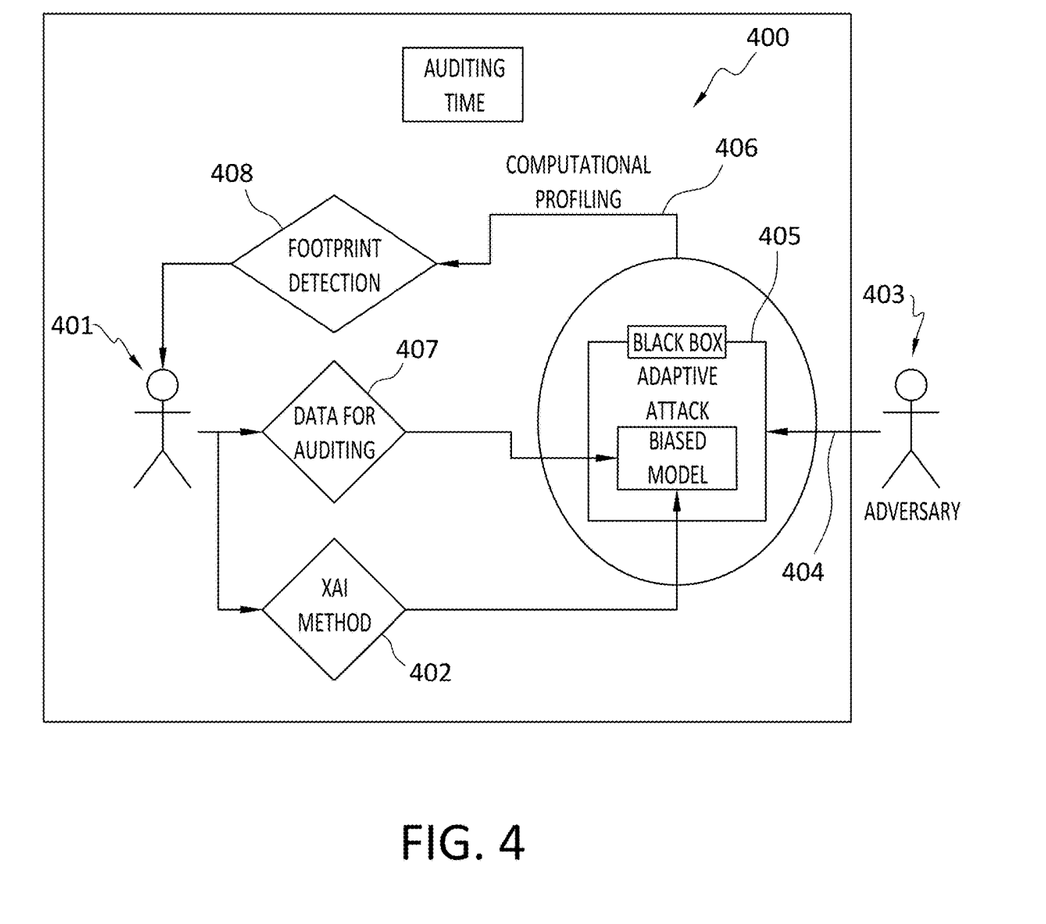
FIG. 4 discloses an example method and architecture according to some embodiments.

It is noted with respect to the disclosed methods, including the example method of FIG. 4, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, there is disclosed an example auditing scenario and method 400 in which some embodiments of the invention may be used to detect adversarial tampering at auditing time. As disclosed there, the auditor, as well as the adversarial black box with the biased model and adaptive attacks, are outside the influence of the adversary at auditing time, which may thus enable the auditor to employ the profiling strategy proposed.

In general, the method 400 may involve an auditor 401, adversary 403, and ML model 405, which may be configured as a black box, possibly by the adversary 403. The ML model 405 may be any model(s) whose operation and components are not accessible to the auditor 401. Further, the ML model 405 may be constructed, and/or operate, to generate one or more outputs that are biased in some way.

The method 400 may begin when the auditor 401 provides data 407 for the auditing process, and implements an XAI method 402 that operates on the ML model 405. As the auditor 401 is performing the XAI method 402, the adversary 403 may instantiate an adaptive attack 404 directed at the XAI method 402. As a result of the adaptive attack 404, a computational profile may be automatically generated 406. In general, the computational profile may comprise any data and/or metadata that is generated as a result of the adaptive attack 404, and is uniquely characteristic, in one or more respects, of the performance of the attack. That is, absent the adaptive attack 404, such data and/or metadata of the computational profile would not have been generated. Thus, in some embodiments, the computational profile, which may also be referred to herein as an 'attack profile,' may comprise data and/or metadata indicating an extent to which the adaptive attack 404 has used, or attempted to use, computing resources including, but not limited to, communication bandwidth, data storage, and memory consumption, and the attack profile may additionally or alternatively comprise data and/or metadata identifying, for example, a number routine calls, timestamps indicating when the calls were made, and a number and timestamps of IOs (input/output operations).

The attack profile that has been generated 406 as a result of the adaptive attack 404 may then be input to a footprint detection process 408. The footprint detection process 408 may evaluate the attack profile to determine information such as, but not limited to, the nature of the attack, the source of the attack, start/end times for the attack, possible effects of the attack on one or more outputs of the model 405, and how those possible effects differ from what the model 405 output would have been absent the attack.

After footprint detection 408 has been performed, the auditor 401 may take various actions. Such actions may include, but are not limited to, notifying the adversary 403 that the attack has been detected, and notifying a third party that the model 405 is biased and is not trustworthy.

E. Further Discussion

Some embodiments of the invention may possess various useful features and advantages. For example, embodiments may implement a solution to XAI adversarial attacks that operates to detect adversarial tampering at auditing time by collecting and evaluating computational footprint information. Some embodiments may determine a number of function calls and computational time as examples of such footprint information, although embodiments may operate with whichever other computational footprints the auditor has access to regarding the adversary' model at auditing time, where such computational footprints may comprise, by way of example, memory usage, CPU usage, and GPU usage.

Some embodiments may be adaptable to new attack methods and explanation methods that may be developed. Embodiments may operate to detect attacks, as such attacks tend to require optimization, and must be performed at auditing time. Moreover, embodiments are not constrained by data-type, and may be applied to text, image or tabular classifiers, or any other type of information that may be generated as a result of an attack.

Finally, and in contrast with conventional approaches, some embodiments may be focused not on making models more resilient to adversarial perturbations, or detection of manipulation on outputs but, instead, on detecting adversarial tampering through the computational footprints, which may be a more robust approach and better suited to consideration of the particularities of each model/XAI method than such conventional approaches.

F. Further Example Embodiments

Following are some further example embodiments of the invention. These are presented only by way of example and are not intended to limit the scope of the invention in any way.

Embodiment 1. A method, comprising: initiating an audit of a machine learning model; providing input data to the machine learning model as part of the audit; while the audit is running, receiving information regarding operation of the machine learning model, wherein the information comprises a computational resource footprint; analyzing the computational resource footprint; and determining, based on the analyzing, that the computational resource footprint is characteristic of an adversarial attack on the machine learning model.

Embodiment 2. The method as recited in embodiment 1, wherein the audit comprises an explainable artificial intelligence audit.

Embodiment 3. The method as recited in any of embodiments 1-2, wherein the adversarial attack is associated with an adversary that controls the machine learning model.

Embodiment 4. The method as recited in any of embodiments 1-3, wherein the computational resource footprint comprises information regarding computational resources consumed by the adversarial attack.

Embodiment 5. The method as recited in any of embodiments 1-4, wherein the adversarial attack changes an output of the machine learning model from what the output would have been had the adversarial attack not occurred.

Embodiment 6. The method as recited in any of embodiments 1-5, wherein the adversarial attack introduces a bias into an output generated by the machine learning model.

Embodiment 7. The method as recited in any of embodiments 1-6, wherein the audit is performed without knowledge of a structure or operation of the machine learning model.

Embodiment 8. The method as recited in any of embodiments 1-7, wherein the audit comprises a gradient method explainable artificial intelligence audit.

Embodiment 9. The method as recited in any of embodiments 1-8, wherein the audit comprises a perturbation method explainable artificial intelligence audit.

Embodiment 10. The method as recited in any of embodiments 1-9, wherein the adversarial attack cannot be trained in a single pass through the machine learning model and/or the adversarial attack relies for its effectiveness on second order gradients of an output of the machine learning model as a function of the input data.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
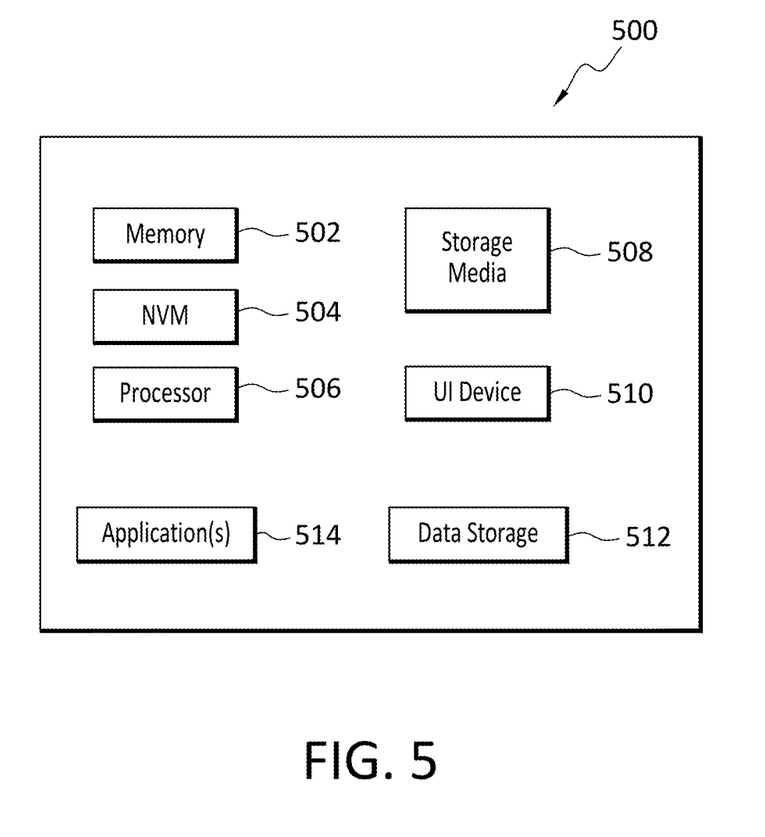
FIG. 5 discloses an example computing entity operable to perform any of the disclosed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI (user interface) device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   initiating an audit of a machine learning model for deployment;
   providing input data to the machine learning model as part of the audit;
   while the audit is running, receiving information regarding operation of the machine learning model, wherein the information comprises a computational resource footprint;
   analyzing the computational resource footprint to calculate a deviation of the computational resource footprint from baseline parameters; and
   in a case where the deviation is greater than known benchmarks:
      asking the machine learning model for access to architectures internals; and
      in a case where the access is denied, determining that the computational resource footprint is characteristic of an adversarial attack on the machine learning model and marking the machine learning model as unacceptable,
   wherein the computational resource footprint indicates an extent to which the adversarial attack has used, or attempted to use, computing resources including communication bandwidth, data storage, and memory.

2. The method as recited in claim 1, wherein the audit comprises an explainable artificial intelligence audit.

3. The method as recited in claim 1, wherein the adversarial attack is associated with an adversary that controls the machine learning model.

4. The method as recited in claim 1, wherein the computational resource footprint comprises information indicating a number of function calls made by the adversarial attack.

5. The method as recited in claim 1, wherein the adversarial attack changes an output of the machine learning model from what the output would have been had the adversarial attack not occurred.

6. The method as recited in claim 1, wherein the adversarial attack introduces a bias into an output generated by the machine learning model.

7. The method as recited in claim 1, wherein the audit is performed without knowledge of a structure or operation of the machine learning model.

8. The method as recited in claim 1, wherein the audit comprises a gradient method explainable artificial intelligence audit.

9. The method as recited in claim 1, wherein the audit comprises a perturbation method explainable artificial intelligence audit.

10. The method as recited in claim 1, wherein the adversarial attack cannot be optimized in a single pass through the machine learning model and/or the adversarial attack relies for its effectiveness on second order gradients of an output of the machine learning model as a function of the input data.

11. A non-transitory storage medium having stored therein instructions that are executable by one or more hardware processors to perform operations comprising:
   initiating an audit of a machine learning model for deployment;
   providing input data to the machine learning model as part of the audit;
   while the audit is running, receiving information regarding operation of the machine learning model, wherein the information comprises a computational resource footprint;
   analyzing the computational resource footprint to calculate a deviation of the computational resource footprint from baseline parameters; and
   in a case where the deviation is greater than known benchmarks:
      asking the machine learning model for access to architectures internals; and
      in a case where the access is denied, determining that the computational resource footprint is characteristic of an adversarial attack on the machine learning model and marking the machine learning model as unacceptable,
   wherein the computational resource footprint indicates an extent to which the adversarial attack has used, or attempted to use, computing resources including communication bandwidth, data storage, and memory.

12. The non-transitory storage medium as recited in claim 11, wherein the audit comprises an explainable artificial intelligence audit.

13. The non-transitory storage medium as recited in claim 11, wherein the adversarial attack is associated with an adversary that controls the machine learning model.

14. The non-transitory storage medium as recited in claim 11, wherein the computational resource footprint comprises information indicating a number of function calls made by the adversarial attack.

15. The non-transitory storage medium as recited in claim 11, wherein the adversarial attack changes an output of the machine learning model from what the output would have been had the adversarial attack not occurred.

16. The non-transitory storage medium as recited in claim 11, wherein the adversarial attack introduces a bias into an output generated by the machine learning model.

17. The non-transitory storage medium as recited in claim 11, wherein the audit is performed without knowledge of a structure or operation of the machine learning model.

18. The non-transitory storage medium as recited in claim 11, wherein the audit comprises a gradient method explainable artificial intelligence audit.

19. The non-transitory storage medium as recited in claim 11, wherein the audit comprises a perturbation method explainable artificial intelligence audit.

20. The non-transitory storage medium as recited in claim 11, wherein the adversarial attack cannot be optimized in a single pass through the machine learning model and/or the adversarial attack relies for its effectiveness on second order gradients of an output of the machine learning model as a function of the input data.

* * * * *